3,697,285
FISH PROTEIN SOLUBILIZATION USING ALKALINE BACTERIAL PROTEASE

William T. Faith, Jr., Warminster, Ronald B. Steigerwalt, Levittown, Ernest A. Robbins, Bristol, Pa., assignors to Rohm and Haas Company, Philadelphia, Pa.
No Drawing. Filed Oct. 10, 1969, Ser. No. 865,534
Int. Cl. A23j 1/04
U.S. Cl. 99—18                                                16 Claims

ABSTRACT OF THE DISCLOSURE

The use of alkaline bacterial protease in enzymatic hydrolysis to effect solubilization and extraction of protein from fish, fish products or fish parts.

BACKGROUND OF THE INVENTION

Field of the invention

The present invention relates to the production of soluble protein extracts from fish. More particularly the invention is directed to the use of alkaline bacterial protease in the treatment of, for example, whole fish, fish meal, parts of fish, fish protein concentrate, etc., in order to effect enzymatic hydrolysis of protein, and allow extraction thereof.

Brief description of the prior art

Protein extraction processes are known in the art of fish processing. For example, U.S. Pat. No. 3,252,962 discloses a process whereby fish, preferably whole, are comminuted and then slurried in 2 to 10 volumes of water, containing sufficient acid, e.g. sulfuric acid, to adjust the pH to 3.5–6.0. To yield lighter products, the slurry pH can be as low as 3.0. An antioxidant is utilized, and the resulting protein precipitate is solvent extracted using a bland solvent such as isopropanol, and dried. The process, after further extraction, rehumidification, and drying yields a colorless, odorless fish flour.

The use of enzymes has also been suggested for the treating of both whole and cleaned and eviscerated fish. U.S. Pat. No. 3,170,794 discloses an enzymatic treatment process utilizing a fungal enzyme produced by oryzae-flavus type molds of the genus Aspergillus. The process, however, is characterized by operation at from about 86° to 149° F. under acid conditions (pH of 5.3–5.6).

In the process of U.S. Pat. No. 3,249,442, fish are disintegrated on board the fishing vessel and subjected to enzymatic treatment while on board ship. This process, in in the same manner as Pat. No. 3,170,794, utilizes an acidic medium, i.e. a pH of about 4.5.

Previous enzymatic processes generally involve the use of temperature and pH conditions which allow an undesirable degree of bacterial contamination. In addition, amino acids such as tryptophan could not be recovered with their full nutritional value, due to acid sensitivity. The present processes, however, employ higher temperatures and yet preserve the food values of acid-sensitive amino acids. Moreover, in certain embodiments of the present invention as set out below, the present enzymes allow for the use of isopropanol as a solvent during the enzymatic hydrolysis, which has not heretofore been possible.

SUMMARY OF THE INVENTION

The present invention is directed to processes wherein alkaline bacterial protease is employed to effect the solubilization of protein in fish. In the embodiment wherein raw fish is utilized, the fish or fish parts are comminuted and then permitted to react with the enzyme under suitable conditions to produce a water-soluble protein hydrolyzate. The aqueous, protein-rich phase of the reaction slurry is separated from the oil and solids and they may be dried, e.g. by freeze drying or spray drying, producing a product which may be termed isolated fish protein (IFP).

Alternatively, fish protein concentrate (FPC), e.g. the product obtained by the isopropanol (IPA) process developed by the U.S. Bureau of Commercial Fisheries, or fish meal could be processed according to the method of the present invention to produce a soluble isolated fish protein.

In another embodiment of the present invention, the IPA process may be modified to produce isolated fish protein. In this method, alkaline bacterial protease is used to solubilize the protein in a mixture containing up to about 60% isopropanol. The enzymatic hydrolysis may be performed during the isopropanol extraction step or thereafter during processing. This possibility is surprising in view of the fact that the various enzymes heretofore utilized in fish processing are not active in isopropyl alcohol and hence could not be employed in the manner of the present invention.

Current IPA processes results in crude FPC having up to 35% isopropanol as well as undesirable amounts of bone material. The present invention advantageously permits further procesisng of the crude FPC while the isopropanol remains in the system; furthermore the deboning procedures previously needs to remove the undesirable material are not necessary when the protein is enzymatically solubilized by alkaline bacterial protease according to the present invention. Moreover, the efficiency of isopropanol recovery is greatly improved by the present embodiment.

Alternatively, it is to be noted that current IPA and fish meal processes suffer from the formation of a sludge, or oil-water-protein fines emulsion, i.e. fish stick liquor, fish solubles, or FPC vessel sludge. According to another embodiment of the present invention, such emulsions may be broken down by subjecting them to the action of alkaline bacterial protease. Such a process step presents an improvement in known processes, and allows for more complete protein recovery and greater efficiency of isopropanol and oil recovery than heretofore possible.

The products of the present invention are water soluble and thus have many uses as protein additives; for example the solution may be utilized in high protein drinks or other foods to combat malnutrition, and in animal feed supplements. Such relatively inexpensive, palatable protein sources are increasingly important as increases in population aggravate the problem of producing sufficient high protein food.

DETAILED DESCRIPTION

In the embodiment of the present invention wherein raw fish or portions thereof are treated, the material is first comminuted to the desired particle size and then allowed to react in a slurry containing the enzyme. The particle size depends on the type of fish treated as well as the equipment utilized. Generally, smaller particles allow for shorter reaction times and more efficient solubilization, and thus small particles are preferred, for example on the order of one-fourth inch.

Based on an enzyme preparation with an activity of about 350,000 azocasein units (AZDU) per gram, the enzyme is desirably employed in the present process in amounts of from 0.1% to 1.0% by weight, based on the raw fish. Amounts of enzyme less than about 0.1% result in hydrolysis which is too slow to be generally economical, and amounts greater than about 1% would generally be uneconomical due to the cost of the enzyme. If an enzyme preparation is used which has an activity substantially different from the aforesaid value, the appropriate correction factor is of course to be applied to the weight of enzyme.

The process of the present invention may be carried out between about 20° and 75° C. For general use, it is advantageous to perform the enzymatic hydrolysis between about 40° and 65° C., and most preferably between about 55° and 65° C.

In general, it is desirable to utilize as high a temperature as practical since higher temperatures within the aforesaid range increase alkaline bacterial protease activity.

In addition, higher temperatures decrease the chances of bacterial contamination, which is especially important in the preparation of food grade products.

For a given amount of protein to be solubilized, the time required for the hydrolysis bears an inverse relation to the enzyme concentration. Generally, longer exposure to the enzyme increases the risk of such problems as thermophilic bacterial contamination, and thus it is desirable to keep the times as short as is practical.

The reaction mixture utilized in the practice of the present invention usually contains up to 30% by weight of solids, preferably about 10 to 20% by weight. However, the solids content utilized is not critical, but depends on such factors as the material treated and the equipment utilized. The slurry must be thin enough to allow for sufficient agitation of the solids, and thus good mixing, but thick enough to minimize solvent recovery costs.

The pH of the reaction mixture must be alkaline, generally from about 7.5 to 11, and preferably about 8 to 10.5. As hydrolysis proceeds, the pH of the mixture may decrease, which results in slower solubilization of the remaining protein. Thus it is often necessary to adjust the pH with an alkaline material, e.g. sodium hydroxide, during the enzymatic process. If the pH is allowed to go outside of the alkaline range at which the enzyme is active, the total amount of protein solubilized is decreased.

Alkaline bacterial protease, utilized in the present invention, is well known in the art and readily available. Generally, proteases are characterized as acid, alkaline or neutral depending upon the pH range at which their optimum activity is observed. Alkaline bacterial protease is derived from microorganisms of the genus Bacillus, and usually from members of the species *Bacillus subtilis*. Bacteria of this species generally produce enzyme compositions having both alkaline and neutral bacterial protease activity, but enhancement of the desired protease activity can be accomplished by strain selection or nutritional adaptation. For example, although generally a *B. subtilis* strain produces both the alkaline, serine protease and the neutral, metal dependent protease, strains are known which give predominantly one or the other. Inactivation of neutral protease during growth or processing can also cause the alkaline protease to predominate.

Various forms of alkaline bacterial protease have been extensively characterized. See, e.g., E. L. Smith et al., J. Biol. Chem., 243, 2184 (1968); D. Tsuru et al., Agr. Biol. Chem., 31, 330 (1967); L. Keay et al., Biochem. Biophys. Res. Comm., 34, 600 (1969).

Commercial alkaline bacterial protease preparations are available from various sources, including Rohm and Haas Co., Philadelphia (Protease 58); Novo Industries (Alcalase); Chas. Pfizer & Co., Inc. (Maxatase); Union Carbide Corp. (U-Carb); Monsanto Co. (Monzyme); and Miles Laboratories, Inc. (Milezyme). It is to be understood that most bacterial protease preparations may contain at least a small amount of neutral bacterial protease as well as alkaline bacterial protease, and some may comprise as much as half neutral protease. Although it is desirable to employ pure alkaline bacterial protease in the present processes, it is also acceptable to employ such enzyme mixtures in the present processes, taking into account that a portion of the enzyme activity is not alkaline bacterial protease.

After the enzymatic hydrolysis, the resulting slurry of protein solution, oil and solids is then separated into its components, e.g. by filtering out the solids and then centrifuging and decanting to separate the oil/water mixture. The solution in water and/or other solvent may then be dried, for example, by spray drying, drum drying, air drying or lyophilization to obtain a solid, soluble, isolated fish protein.

The above separation steps may be modified, for example, by hexane extraction of the oil (1) with countercurrent technique prior to solids removal or (2) after drying the oil-water mixture.

When treating fish meal or FPC, the aforesaid conditions would also apply, except that neither of these materials requires an additional comminution step since FPC is a powder and fish meal usually passes a 20-mesh screen.

Another embodiment of the present invention is based on the discovery that alkaline bacterial protease retains a relatively high level of activity in solutions containing substantial amounts of alcohol. Inasmuch as most enzymes exhibit drastic reduction in activity in the presence of even small amounts of alcohol, it is particularly surprising that alkaline bacterial protease has now been found useful in alcohol-water mixtures.

In general, any of the processes described hereinabove may be carried out in the presence of alcohol, e.g., isopropanol. In general, it is desirable to maintain the alcohol concentration at a low level for maximum enzymatic activity, but if desired, reaction mixtures containing up to 60% isopropanol may be treated according to the present invention.

In addition, an alternative embodiment of the present invention contemplates the improvement of current IPA process for preparing fish protein concentrate by incorporating therein the step of treating the mixture with alkaline bacterial protease.

The conventional process designed by the U.S. Bureau of Commercial Fisheries is described, for example, in Chemical Engineering, 73 (4), 98–100 (Feb. 14, 1966). This process involves a three-stage countercurrent isopropanol extraction of ground whole fish; the modification according to the present invention would involve adding alkaline bacterial protease in the first or second of the three extractors, wherein the isopropanol concentration would be maintained at a level below about 60%, and the temperature, pH and other reaction conditions as generally set forth hereinabove. The remaining solids would be only bony material, which could easily be separated by filtration, producing a boneless product of isolated fish protein rather than a bony FPC, which requires a separate deboning step to produce even a low-bone product.

Alternatively, another modification according to the present invention would involve the treatment of the dried intermediate product of the IPA process with alkaline bacterial protease prior to the presently-employed deboning step, so that the protein would be solubilized at that point and thereby effectively separated from the bone without a physical deboning operation.

The following examples will serve as further illustration of the various embodiments of the present invention.

Example 1

Ten lb. fresh raw hake is comminuted to ¼ in. average particle size and placed in 10 gal. of water containing 0.0075 lb. of alkaline bacterial protease. Sodium hydroxide is added to adjust the pH to 10.0, and the slurry is heated to 60° C. for 3 hrs., with agitation by 150 r.p.m. impeller blades.

The slurry is then filtered to remove the bony solids remaining, and the filtrate is passed through a centrifuge to separate the oil and water phases. The aqueous phase, containing the solubilized protein, is then flash evaporated to one-half its original volume and spray dried. The isolated fish protein product, containing in excess of 85% protein, is obtained in an amount approximately 15% of the wet weight of the fresh fish.

Example 2

The process of Example 1 is carried out through the filtration step to remove bony material. The filtrate is then subjected to countercurrent extraction with hexane to remove the oil. The aqueous phase is then flash evaporated and spray dried, as in Example 1.

Example 3

The process of Example 1 is carried out through the filtration step to remove bony material. The filtrate is then flash evaporated to one-half its original volume and spray dried. The resultant dried mixture of protein hydrolyzate and oil may be collected as product or may be washed repeatedly with isopropanol to remove the oil.

Example 4

Various amounts of fish protein concentrate (FPC) produced from whole hake were suspended in flasks containing 100 ml. water. The FPC was obtained from the Technological Laboratory, U.S. Bureau of Commercial Fisheries, College Park, Md., and was found by Kjeldahl analysis to contain 70% protein. It contained no oil; thus most of the remainder of the FPC was bony matter. The pH of the aqueous suspensions of this FPC was 6.8. Dilute sodium hydroxide was employed to adjust the pH of the suspensions to 8.5.

Alkaline bacterial protease was added to each flask, in the amount of 0.5% based on the weight of FPC. The protease was an experimental sample of the alkaline *B. subtilis* protease now commercially available in food grade as Protease 58 from the Industrial Chemicals Department of Rohm and Haas Co., Philadelphia. The protease had an activity of 350,000 azocasein units (AZDU) per gram, as determined by the increase of chromophores soluble in trichloroacetic acid upon treatment of azocasein with the enzyme for 20 min. at pH 8.5 and 40° C.

The flasks were agitated at 275 r.p.m. and maintained at 60° C. for 6 hrs. After the reaction period, solids were removed by centrifugation at 10,000 r.p.m. for 3 min., and total protein in the supernatant fluid was determined by Kjeldahl analysis at pH 8.5, calculated using a factor of 6.25. Lactic acid was then employed to precipitate isoelectric protein at a pH of 4.5; the precipitate was then separated by centrifugation, dried and weighed. The remaining liquid was mixed with 10% trichloroacetic acid (TCA) to precipitate unhydrolyzed protein, which was separated by centrifugation, dried and weighed. Table I presents the results of these determinations.

TABLE I.—ENZYMATIC TREATMENT OF FPC IN 100 ML. WATER

| Run | FPC treated (g.) | Alkaline *B. subtilis* protease (mg.) | Protein soluble (percent) | Protein soluble at isoelectric point (percent) | Protein soluble in trichloroacetic acid (percent) |
|---|---|---|---|---|---|
| 1 | 5.0 | 25.0 | 99.0 | 94.0 | 93.2 |
| 2 | 10.0 | 50.0 | 98.0 | 94.0 | 93.8 |
| 3 | 15.0 | 75.0 | 90.2 | 86.2 | 85.4 |
| 4 | 20.0 | 100.0 | 85.4 | 80.0 | 79.2 |

Example 5

Comparative tests were run on the fish protein concentrate of Example 4 utilizing the alkaline bacterial protease of Example 4 and Pronase, a protease preparation derived from *Streptomyces griseus*, commercially available from Calbiochem, Los Angeles. The FPC was suspended in water at a solids level of 10% (5 g. in 50 ml. water) and permitted to react for 3 hr. at a pH of 7.4 at 40° C. and a pH of 10.0 at 60° C. The relative amounts of protein solubilized is shown in Table II. For equivalent weights of enzyme, Pronase was found to exhibit 9 times the azocasein digestion activity of the alkaline bacterial protease in the absence of sodium tripolyphosphate. Thus the somewhat greater activity of alkaline protease on a weight-for-weight basis, as shown in Table II, indicates approximately tenfold greater effectiveness of bacterial protease compared to the *Streptomyces* derivative on an equal activity basis.

TABLE II.—ENZYMATIC TREATMENT OF FPC

| | pH 7.4 at 40° C. | | pH 10.0 at 60° C. | |
|---|---|---|---|---|
| Percent enzyme | Pronase | Alkaline bacterial protease | Pronase | Alkaline bacterial protease |
| 0.0 | 7.0 | 7.0 | 23.7 | 23.7 |
| 0.1 | 51.4 | 57.2 | 60.6 | 68.8 |
| 0.2 | 59.7 | 68.0 | 66.0 | 75.2 |
| 0.5 | 69.9 | 74.4 | 78.6 | 88.5 |

Example 6

In this experiment, 10 g. of the fish protein concentrate of Example 4 was mixed with 50 ml. water (solids level 20%). The pH was adjusted to 10 with sodium hydroxide, and 50 mg. of the alkaline bacterial protease of Example 4 was added.

The slurry was permitted to react at 60° C. for 30 min., and an additional 5 g. of FPC was then added. The slurry was permitted to react for 2½ hours more and was then centrifuged. The residue was then resuspended in 50 ml. water, and an additional 10 mg. of the protease was added. The slurry was permitted to react at 60° C. for 2 hours and was then centrifuged.

The supernatant fluid of the second centrifugation step was combined with that of the first centrifugation step. By Kjeldahl analysis, it was determined that the combined solution contained 9.96 g. of solubilized protein. Thus, 95% of the available protein was solubilized, using a total of 0.4% protease based on the total weight of FPC.

Example 7

Ten. g. of FPC was mixed with 100 ml. water, and 50 mg. of the enzyme of Example 4 was added. The pH was adjusted to 10.5, and the slurry was permitted to react for three hours at 60° C. The mixture was then centrifuged, and the resulting supernatant fluid was found to contain 93% of the available protein.

A carbonated drink was prepared with a protein content of 4.0%, as compared to 3% protein presently employed in comparable soy protein drinks, such as Saci (Coca Cola Co.). The drink was prepared with sucrose and vanilla and had a pleasant taste without any "fishy" flavor or odor.

Example 8

A sample of FPC vessel sludge was obtained from the SWECO Pilot Plant (IPA process) at Texas A&M University. The sludge was an emulsion of protein fines, oil, water and isopropanol and had a pH of 7.9. It was shipped with a concentration of 60% isopropyl alcohol, most of which was removed by vacuum evaporation. The sample was then treated with 0.5% of the alkaline bacterial protease of Example 4 at 40° C. for eight hours. The resulting material had a large clear aqueous bottom layer and a top oil layer containing some suspended fines. A control sample without the enzyme had an oil layer, a small water layer, and a large solids layer on the bottom.

The emulsion, with isopropanol removed, contained 30% protein. In the control sample, 10% of the protein was solubilized, while in the treated sample about 75% of the available protein was solubilized. There was no damage to the oil portion in the treated sample.

Example 9

The FPC vessel sludge of Example 8 was treated with alkaline bacterial protease, with varying amounts of isopropanol permitted to remain during hydrolysis.

The samples of sludge were flash evaporated to remove various portions of the isopropanol and then diluted with water back to the original volume of 100 ml. One hundred mg. of the protease of Example 4 was added to the sample (0.5% based on solids). The slurry was permitted to react at 60° C. for six hours under agitation at 275 r.p.m. The reaction was carried out at ambient pH, which was 7.9 at the beginning of each reaction. Following the reaction, the mixture was centrifuged to 10,000 r.p.m. for 3 minutes; in each case a large oil layer was present, with a clear aqueous layer below and a slight residue at the bottom—similar to the result of Example 8.

Table III presents the results of these runs. It can be seen that the treatment of sludge containing moderate amounts of isopropanol with alkaline bacterial protease according to the present invention is effective in breaking the emulsion and improving the recovery of the various components.

TABLE III.—TREATMENT OF FPC VESSEL SLUDGE CONTAINING ISOPROPANOL ALCOHOL

| Isopropanol remaining in sample (percent) | Protein in solution (g.) | Fraction of initial protein in solution (percent) | Oil removed (g.) | Fraction of initial oil recovered (percent) |
| --- | --- | --- | --- | --- |
| 2 | 5.60 | 93.5 | 10.5 | 75.0 |
| 8 | 5.40 | 90.0 | 10.7 | 76.4 |
| 16 | 5.45 | 90.8 | 11.4 | 81.5 |
| 24 | 5.30 | 88.5 | 11.8 | 84.3 |

Example 10

Menhaden fish meal from H. J. Baker and Brothers, Inc., New York, which contained 70% protein and formed a slurry with pH 5.3 was treated with the alkaline bacterial protease of Example 4. Table IV presents the results of various treatment conditions.

The solution obtained from Run 2 was subsequently freeze-dried; and isolated fish protein product containing 82.5% soluble protein was obtained.

TABLE IV

| | Control | Run 1 | Run 2 |
| --- | --- | --- | --- |
| pH | 10.0 | 10.0 | 8.5 |
| Percent enzyme | 0 | 0.5 | 0.5 |
| Temperature, °C | 60 | 60 | 60 |
| Time, hours | 3 | 3 | 4 |
| Percent solubilization | 20.2 | 73.5 | 77 |

Example 11

Anchovette fish meal from Peru, obtained from J. J. Ryan Company, was treated as follows.

A 70 g. sample was suspended in 600 ml. of water, the pH adjusted to 8.5 with 14 ml. of NaOH solution, and the volume brought to 700 ml. A solution of 0.35 g. of the enzyme of Example 4 in 10 ml. water was added. A sample was immediately removed for a zero time control. The suspension was stirred continuously, maintained at 60° C. and the pH adjusted periodically. Samples were removed at 2, 4, 6, 11 and 22 hours, centrifuged at 10,000 r.p.m. for 3–5 minutes, and the Kjeldahl nitrogen measured in the supernate to determine the amount of protein solubilization.

During the first 45 minutes, the pH dropped to 6.48, and was adjusted to 8.5. At 2 hours the pH was adjusted from 7.5 to 8.4, and maintained at 8.1 to 8.7 thereafter. pH adjustments were made with 19.4 N NaOH. The following table summarizes the results.

TABLE V.—ENZYMATIC TREATMENT OF ANCHOVETTE FISH MEAL

| Incubation time (hours) | 0 | 2 | 4 | 5 | 11 | 22 |
| --- | --- | --- | --- | --- | --- | --- |
| Percent solubilization | 9.0 | 52.5 | 64.5 | 70.0 | 74.0 | 82.4 |

[1] Grams protein sobulilized per 100 gm. of fish meal protein.

Example 12

Several samples of anchovette fish meal were treated in varying concentrations of isopropanol in water to determine the effect of isopropanol on alkaline bacterial protease. In these runs a protease concentration of 0.5% was used and the experiments were made at 60° C. for 4 hours with an initial pH of 8.5. No pH adjustments were made. Table VI below shows the resulting solubilization, determined according to the previously noted procedure:

TABLE VI

| Run Number | 1 | 2 | 3 | 4 | 5 | 6 | 7 | 8 |
| --- | --- | --- | --- | --- | --- | --- | --- | --- |
| $H_2O$ (ml.) | 0 | 20 | 40 | 60 | 80 | 90 | 95 | 100 |
| Isopropanol (ml.) | 100 | 80 | 60 | 40 | 20 | 10 | 5 | 0 |
| Final pH | 6.6 | 6.86 | 6.85 | 6.82 | 7.05 | 7.08 | 6.85 | 6.80 |
| Percent solubilization | 3.4 | 5.4 | 9.1 | 10.3 | 13.2 | 29.5 | 34.0 | 36.4 |

Example 13

In the following runs, the effect of isopropyl alcohol when treating anchovette fish meal was determined. In each case 80 g. of anchovette fish meal was suspended in 720 ml. of liquid, the pH adjusted as indicated, and the suspension brought to 60° C. The alkaline bacterial protease of Example 4 was then added, and the suspension stirred continuously. In all but the first two runs the pH was continuously monitored. Measured values were obtained by using previously noted procedures. The results are summarized in Table VII.

TABLE VII.—SOLUBILIZATION OF ANCHOVETTE FISH MEAL

| Trial number | Percent Enzyme | Percent Isopropanol | Percent solubilization 2 hr. | 3 hr. | 4 hr. | 6 hr. | 8 hr. | 11 hr. | 22 hr. | pH range |
| --- | --- | --- | --- | --- | --- | --- | --- | --- | --- | --- |
| 1 | 0.5 | 0 | 52.5 | | 64.5 | 70.0 | | 74.0 | | (1) |
| 2 | 1.0 | 0 | 68.5 | 75.9 | 80.0 | 83.4 | 82.5 | | | (2) |
| 3 | 1.0 | 30 | 16.5 | | 22.2 | 18.3 | | | 19.5 | 8.0–8.5 |
| 4 | 1.0 | 15 | 34.0 | | 35.0 | 34.5 | | | 36.0 | 8.0–8.5 |
| 5 | 1.0 | 0 | 75.5 | 80.6 | 82.2 | 85.4 | 88.1 | | 92.6 | 9.0–9.5 |
| 6 | 1.0 | 15 | 29.6 | | 31.2 | 32.9 | 34.5 | | 40.0 | 9.0–9.5 |
| 7 [3] | 1.0 | 0 | | | | | | | | 9.0–9.5 |
| 8 | 1.0 | 0 | 70.5 | | 79.2 | 79.0 | | | | 9.0–9.5 |
| 9 [4] | 1.0 | 0 | 59.5 | | 62.5 | 62.5 | | | | 9.0–9.5 |

[1] pH initially 8.8, taken from 6.5 to 8.5 at 1 hour, held at 7.5–8.5 thereafter.
[2] pH pattern similar to trial No. 1.
[3] Agitator stopped between hours 9 and 11.
[4] Fish meal cooked for 30 minutes in suspension in autoclave prior to pH adjustment. Agitator stopped between hours 6 and 22.

As can be seen from Table VII a high yield (90–92%) of protein solubilized was obtained when 1% enzyme in aqueous solution was permitted to rest for 22 hours at a pH of 9.0–9.5 and 60° C. However, 80–82% was solubilized in 4 hours.

Moreover, it appears that continuous pH monitoring is warranted. The pH of the suspended meal is 5.7, and as shown in the trials monitoring is required for at least 2 hours after the enzyme is added. In the present trials the pH was controlled by dropwise addition 19.4 N sodium hydroxide.

Example 14

Various commercial preparation containing alkaline bacterial protease were tested for activity in the presence of isopropanol. The digestion of azocasein was used as a standard reaction, as measured by the absorptivity at 425 mμ ($A_{425}$). Relative activity was taken as the ratio of the $A_{425}$ in reaction mixture containing 6.7% by volume isopropanol and $A_{425}$ of the corresponding aqueous mixture. Table VIII presents the results of these tests.

TABLE VII.—ALKALINE BACTERIAL PROTEASE ACTIVITY IN ISOPROPANOL

|  | Activity (AZDU/g.) | Relative activity in 6.7% IPA (percent) |
|---|---|---|
| Protease 58 (Rohm and Haas Co.) | 350,000 | 100 |
| Maxatase (Chas. Pfizer & Co., Inc.) | 329,000 | 93 |
| Alcalase, Lot 819 (Novo Industries) | 360,000 | 89 |
| U-Carb (Union Carbide Corp.) | 362,000 | 90 |
| Monzyme SG 2230 (Monsanto Co.) | 307,000 | 42.5 |
| Milezyme 8X (Miles Laboratories, Inc.) | 392,000 | 38.8 |
| EDCO (Enzyme Development Co.) | 98,000 | 50.5 |

It is to be noted that some of the preparations appeared to lose 50% or more of their activity in 6.7% isopropanol, whereas others exhibited about 90% or more of their activity under the same conditions. This difference is attributed to varying amounts of neutral bacterial protease present in the preparations, the neutral protease component being deactivated by alcohol while the alkaline protease component remains active even in the presence of the lower alcohols, such as methanol, ethanol, or isopropanol.

What is claimed is:

1. A process for the production of a water soluble hydrolyzate of fish protein, which comprises (1) adjusting the pH of a slurry of protein-containing fish material to a value between about 7.5 and 11, (2) adding alkaline bacterial protease in an amount sufficient to produce a water soluble protein hydrolyzate, and (3) hydrolyzing the resultant mixture at a temperature between about 20° and 75° C.

2. The process of claim 1 wherein said pH is adjusted to 8–10.5.

3. The process of claim 1 wherein the hydrolysis is carried out in the presence of a solvent selected from the group consisting of water and mixtures of water and up to about 60% of a lower alcohol.

4. The process of claim 3, wherein the fish material is present in the slurry in an amount of from about 10% to 30% based on the weight of solvent.

5. The process of claim 1 wherein said alkaline bacterial protease is present in an amount of from 0.1% to 1.0% by weight based on the solids in said slurry.

6. The process of claim 1 wherein said fish material is selected from the group consisting of fish, fish meal, parts of fish, fish protein concentrate and oil/water emulsions of fish protein.

7. The process of claim 3 wherein said solvent is water, and the solution of soluble protein hydrolyzate produced by said hydrolysis is dried to produce solid isolated fish protein.

8. In a process for the extraction of protein from fish, including the step of slurrying comminuted fish in a lower alcohol at a temperature between about 20° and 75° C., separating the alcohol extract, and drying the extract, the improvement which comprises adjusting the pH of the slurry to a value between about 7.5 and 11 and adding to the slurry to effect hydrolysis, alkaline bacterial protease in an amount sufficient to produce a water-soluble protein hydrolyzate.

9. The process of claim 8 wherein the alcohol is isopropanol.

10. The process of claim 8 wherein said pH is adjusted to a value between about 8.0 and 10.5.

11. In a process for the production of fish protein concentrate, including the steps of extracting fish protein from comminuted fish or fish parts, whereby a protein-containing oil/water emulsion is produced along with an extract, separating the extract and drying the extract to produce fish protein concentrate, the improvement which comprises removing the oil/water emulsion in said extraction step, adding to said emulsion alkaline bacterial protease in an amount sufficient to produce a water-soluble hydrolyzate and adjusting the pH to a value between about 7.5 and 11, and hydrolyzing said emulsion at a temperature between about 20° and 75° C.

12. The process of claim 11 further comprising the step of adding a medium selected from the group consisting of water and mixtures of water and up to about 60% of a lower alcohol to said emulsion before effecting hydrolysis.

13. The process of claim 1 wherein the hydrolysis is carried out at a temperature between about 55° and 65° C.

14. The process of claim 3 wherein the hydrolysis is carried out at a temperature between about 55° and 65° C.

15. The process of claim 8 wherein the hydrolysis is carried out at a temperature between about 55° and 65° C.

16. The process of claim 11 wherein the hydrolysis is carried out at a temperature between about 55° and 65° C.

References Cited

UNITED STATES PATENTS

| 3,076,708 | 2/1963 | Cavanagh | 99—7 |
| 3,578,461 | 5/1971 | Weeks et al. | 99—7 |
| 3,249,442 | 5/1966 | Keyes | 99—18 |

OTHER REFERENCES

Hale, Relative Activities of Commercially Available Enzymes in the Hydrolysis of Fish Protein, 23 Food Technology 107, January 1969.

Fish Protein Concentrate, Library of Congress, Washington, D.C., 1970, Abstract #213 (1965).

Reed et al., Enzymes Used in Food Processing, Academic Press, New York, 1966, pp. 155–156.

Alcolase Novo Enzymes, pp. 1–13, January 1969.

RAYMOND N. JONES, Primary Examiner

R. B. ANDEWELT, Assistant Examiner

U.S. Cl. X.R.

99—7